United States Patent [19]

Gallant

[11] Patent Number: 4,542,050

[45] Date of Patent: Sep. 17, 1985

[54] DISPOSABLE TABLE COVERING

[76] Inventor: Mark U. Gallant, 24 Purnell Dr., Hamilton, Ontario, Canada, L9C 4Y2

[21] Appl. No.: 602,306

[22] Filed: Apr. 20, 1984

[51] Int. Cl.[4] ................................................ B32B 3/04

[52] U.S. Cl. .................................. 428/35; 150/52 A; 150/52 R; 156/260; 428/121; 428/188; 428/192

[58] Field of Search ............................... D6/616–625; 139/389, 390; 150/52 A, 52 R; 428/35, 192, 188, 121; 493/287, 363, 937, 303; 383/4, 33, 41; 108/161; 156/260

[56] References Cited

U.S. PATENT DOCUMENTS

| | | | |
|---|---|---|---|
| 3,310,091 | 3/1967 | Geisen et al. | 150/52 R |
| 3,557,856 | 1/1971 | Berman | 150/52 R |

*Primary Examiner*—George F. Lesmes
*Assistant Examiner*—P. R. Schwartz
*Attorney, Agent, or Firm*—Hirons, Rogers & Scott

[57] ABSTRACT

A table covering particularly useful when picnicking comprises a generally planar sheet to be lain on a table top with an integrally formed bag-like structure secured at one edge of the sheet. The bag-like structure constitutes a garbage bag in which the sheet and the remains of the meal can be placed for proper disposal. Methods of making the covering from tubular stock are also disclosed.

10 Claims, 6 Drawing Figures

DISPOSABLE TABLE COVERING

Figure 1:
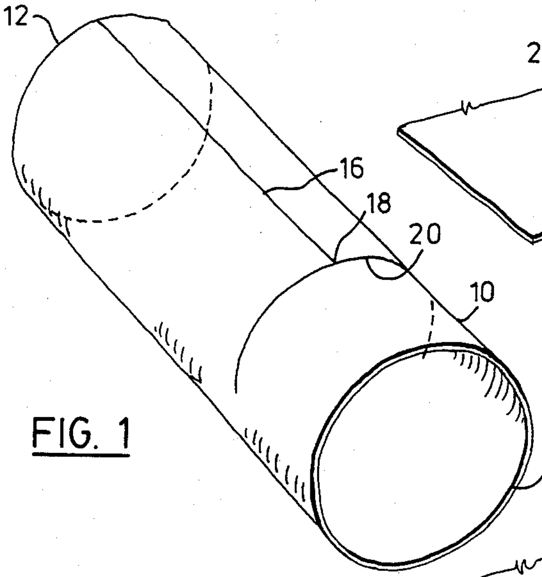

This invention is concerned with disposable table coverings and with methods of making such coverings. The coverings of the invention have particular but not necessarily exclusive, value as picnic table coverings.

The tables provided in public places for picnickers are often none too clean and a table covering such as a cloth is usually used. After the meal is completed, the cloth is shaken, resulting in littering of the area, and the cloth must later be washed before it can be re-used.

The use of disposable utensils when picnicking in public places is common and the acceptable disposable of those utensils, of food and beverage containers and food scraps is a tiresome task often requiring several trips to a waste basket or other disposal location.

The present invention seeks to provide a simple, convenient and inexpensive covering which avoids these problems.

According to one aspect of the present invention there is provided a disposable table covering comprising a generally planar sheet to be lain on the top surface of the table, a bag formed integrally with said sheet and being connected therewith along a portion of one edge of the sheet, said bag having its mouth adjacent said edge and the bottom of the bag being remote from said edge, the girth of the bag being substantially equal to the length of said edge, and said portion of said edge being not greater than one-half of the girth of the bag.

According to another aspect of the present invention there is provided a disposable table covering comprising a generally rectangular sheet to be lain on the top surface of a table, a generally flat tubular structure formed integrally with said sheet and having an open end thereof connected to said sheet along a portion of one edge of said sheet, the length of that edge being approximately equal to the girth of said tubular structure, and the end of said tubular structure remote from said edge being sealed to form a bag.

Preferably the portion of the edge of said sheet is of a length equal to but not greater than one-half the girth of the tubular structure.

According to another aspect of the present invention there is provided a method of making a disposable table covering comprising taking a length of tubular film having first and second end edges and cutting said tubular film to form a longitudinal slit extending along a portion of said film from the first end edge towards the second end edge and a part circumferential slit intermediate said end edges and at the terminal portion of said longitudinal slit, said part circumferential slit being of a length at least equal to one-half the circumference of the tubular film, and sealing the tubular film at said second end edge, the portion of said film between said part circumferential slit and said second end edge constituting a bag and the remainder of said film constituting a sheet to be lain on a top surface of a table.

According to another aspect of the present invention there is provided a method of making a disposable table covering which comprises taking a length of tubular film having first and second edges, cutting said film to form a longitudinal slit extending from said first to said second end edge and a part circumferential slit intermediate said first and second end edges said part circumferential slit being of a length at least equal to one-half the circumference of said tubular film, sealing the edges of said longitudinal slit between said part circumferential slit and said second end edge together, and sealing said second end edge, the portion of the film between said part circumferential slit and said second end edge constituting a bag and the remainder of said film constituting a sheet to be lain on the top surface of a table.

The coverings of the present invention most preferably are formed from blown tubular film and the sheet portion overlies the top surface of the table with the bag hanging down from an edge of the table. After a picnic is completed the food scraps remaining and the various utensils and the food and beverage containers are simply placed in the bag, the sheet portion can be folded into the bag and the whole disposed of simply and tidily.

Figure 2:
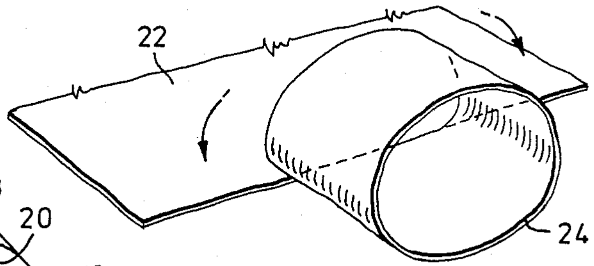
Figure 3:
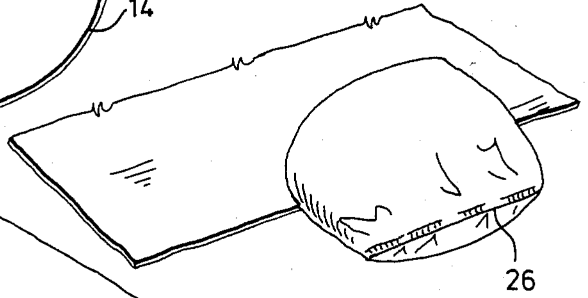
Figure 4:
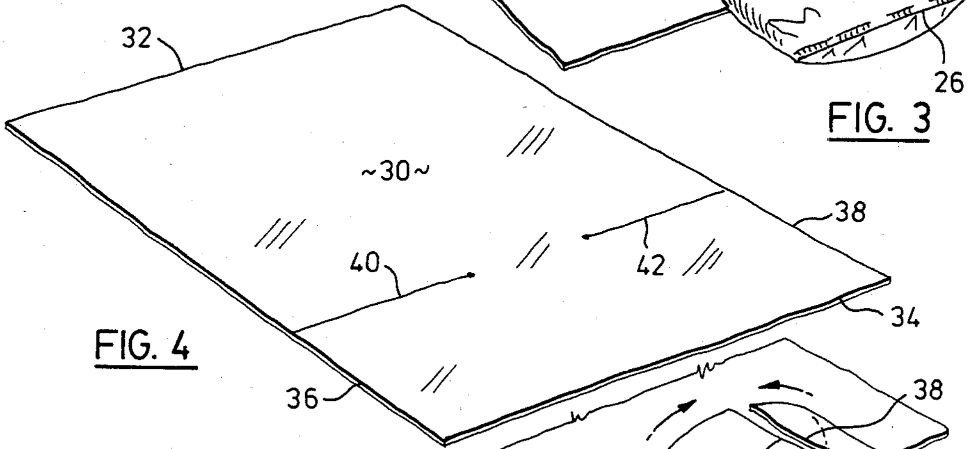
Figure 5:
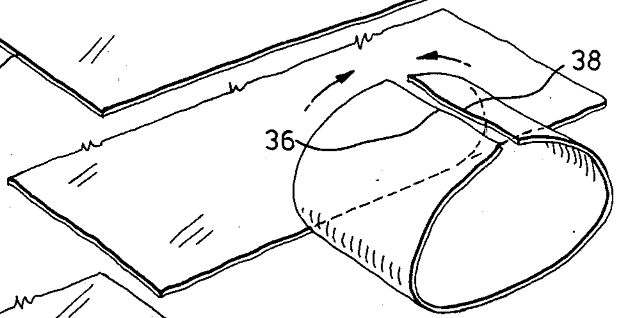
Figure 6:
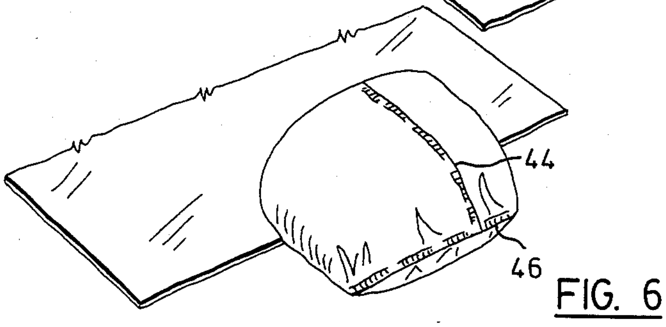

Preferred embodiments of the present invention are illustrated, schematically in the accompanying drawings in which:

FIGS. 1, 2 and 3 are perspective views showing the method of manufacture of a table covering according to the present invention; and FIGS. 4, 5 and 6 are perspective views showing different stages in the production of a second form of table covering according to the present invention.

In FIG. 1 there is shown a length 10 of blown tubular film having a first end edge at 12 and the second end edge at 14. A longitudinal slit is formed in the film from edge 12 extending towards edge 14 and terminating at 18. A part circumferential slit 20 is also formed so that, as can be seen in FIG. 2 the portions of the film between first end edge 12 and the part circumferential slit 20 can be opened up to form a generally planar and rectangular sheet 22 with a tubular structure indicated generally at 24 securcd thereto along a portion of the length of one edge of the sheet. The second end edges of the tubular structure 24 are then sealed as at 26 in FIG. 3 so that there is provided a bag with its mouth adjacent to the sheet and with a closed bottom remote from the sheet.

The circumferential slit 20 extends over one-half the circumference of the tubular film so that the sheet 22 can be lain flat upon a surface without wrinkling at the region where the bag is connected to it.

Additionally the end regions of the part circumferential slit can be treated, as for example, by forming perforations in that region, to limit the tendency for tearing in this region.

An alternative form of the present invention is illustrated in FIGS. 4 through 6. In FIG. 4 there is shown a generally rectangular sheet 30 which may be considered to have opposed end edges 32 and 34 and opposed side edges 36 and 38. Preferably the sheet is made from tubular film with the side edges 36 and 38 being formed by making a slit longitudinally of the film.

A first slit 40 generally parallel to the end edges 32 and 34 and extending from side edge 36 is formed and a second slit 42 parallel to the end edges and extending from the opposite side edge 38 towards slit 40 is formed. The side edges 36 and 38 of that part of the sheet to one side of the slit are then brought together as shown in FIG. 5 and sealed to form a seam as at 44 in this way to form a generally tubular structure. Thereafter the edges of the tubular structure parallel to and remote from the slit are sealed to form a seam as at 46 thus providing a bag secured to an edge of the sheet.

It will be appreciated that a single slit from one edge of the sheet may be used and it would be preferred in that case that the slit have a length at least equal to one-half the length of the end edges of the sheet. In the preferred embodiment illustrated two slits are formed of which the combined lengths are equal to at least one-half the length of the end edges.

It will be appreciated that the present invention provides a simple and very convenient disposable table covering particularly useful when picnicking. The sheet of the covering is lain over the table top with the bag hanging from one edge of that sheet. After the meal is completed the remains of that meal, food and beverage containers and disposable implements are simply placed in the bag, the sheet is also folded into the bag and the whole may then be disposed of easily and acceptably.

We claim:

1. A disposable table covering comprising a generally planar sheet to be lain on the top surface of a table, a bag formed integrally with said sheet and being connected therewith along a portion of one edge of the sheet, said bag having its mouth adjacent said edge and the bottom of the bag being remote from said edge, the girth of the bag being substantially equal to the length of said edge and said portion of said edge being not greater than one-half of the girth of the bag.

2. A covering as claimed in claim 1 wherein said bag is formed with a single seam at the bottom of the bag remote from said edge of said sheet.

3. A covering as claimed in claim 1 wherein said bag is formed with a first seam at the bottom of the bag parallel to and remote from said edge of said sheet and with a second seam extending from the mouth of the bag to the bottom of the bag.

4. A disposable table covering comprising a rectangular sheet to be lain on the top surface of the table, a generally flat tubular structure formed integrally with said sheet and having an open end thereof connected to said sheet along a portion of an edge of that sheet, the length of that edge being approximately equal to the girth of said tubular structure, the end of said tubular structure remote from said edge being sealed to form a bag and the length of said portion of said edge of said sheet being not greater than one-half the overall length of said edge.

5. A covering as claimed in claim 4 wherein said bag is formed with a single seam at the bottom of the bag remote from said edge of said sheet.

6. A covering as claimed in claim 4 wherein said bag is formed with a first seam at the bottom of the bag parallel to and remote from said edge of said sheet and with a second seam extending from the mouth of the bag to the bottom of the bag.

7. A method of making a disposable table covering comprising taking a length of tubular film having first and second end edges and cutting said tubular film to form a longitudinal slit extending along a portion of said film from the first end edge towards the second end edge and a part circumferential slit intermediate said end edges and at the terminal portion of said longitudinal slit, said part circumferential slit being of a length at least equal to one-half the circumference of the tubular film, and sealing the tubular film at said second end edge, the portion of said film between said part circumferential slit and said second end edge constituting a bag and the remainder of said length of film constituting a sheet to be lain on a table.

8. A method of making a disposable table covering comprising taking a length of tubular film having first and second end edges, cutting said film to form a longitudinal slit extending from said first to said second end edge, and to form a part circumferential slit intermediate said first and second end edges said part circumferential slit being of a length at least equal to one-half the circumference of said tubular film, sealing the edges of said longitudinal slit between said part circumferential slit and said second end edge together and sealing said second end edge, the portion of said film between said part circumferential slit and said second end edge constituting a bag and the remainder of said film constituting a sheet to be lain on the table.

9. A method of making a disposable table covering which comprises taking a generally rectangular sheet of plastic film having opposed side edges and opposed end edges, making a slit in said film generally parallel to and intermediate said end edges and extending from one of said side edges towards the other side edge, folding that part of said sheet to one side of the slit to bring the side edges of that part together, sealing those side edges of said part to form a seam and to form a generally tubular structure and thereafter sealing the edges of said tubular structure parallel to and remote from said slit to form a bag.

10. A method as claimed in claim 9 wherein a second slit is formed in said film generally parallel to an intermediate said end edges and extending from said other side edge towards said one of said side edges, the combined lengths of said slits being approximately equal to one-half the length of an end edge of said sheet.

* * * * *